(12) United States Patent
Kimura

(10) Patent No.: US 9,908,523 B2
(45) Date of Patent: Mar. 6, 2018

(54) HYBRID VEHICLE

(71) Applicant: Toyota Jidosha Kabushiki Kaisha, Toyota-shi, Aichi-ken (JP)

(72) Inventor: Masaru Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/229,560

(22) Filed: Aug. 5, 2016

(65) Prior Publication Data
US 2017/0057490 A1 Mar. 2, 2017

(30) Foreign Application Priority Data

Aug. 28, 2015 (JP) .................................. 2015-169279

(51) Int. Cl.
| | |
|---|---|
| *B60W 20/50* | (2016.01) |
| *B60W 10/06* | (2006.01) |
| *B60W 10/08* | (2006.01) |
| *B60L 3/00* | (2006.01) |
| *B60K 6/365* | (2007.10) |

(52) U.S. Cl.
CPC ............ *B60W 20/50* (2013.01); *B60K 6/365* (2013.01); *B60L 3/0023* (2013.01); *B60W 10/06* (2013.01); *B60W 10/08* (2013.01); *B60Y 2300/182* (2013.01); *Y02T 10/7258* (2013.01); *Y10S 903/906* (2013.01)

(58) Field of Classification Search
CPC .............................. B60W 20/50; B60W 20/00
See application file for complete search history.

(56) References Cited

U.S. PATENT DOCUMENTS

| | | | |
|---|---|---|---|
| 8,660,729 B2* | 2/2014 | Miyazaki .............. | B60L 3/0023 180/65.285 |
| 2004/0147364 A1* | 7/2004 | Wakashiro ............ | B60K 6/485 477/3 |
| 2009/0105898 A1* | 4/2009 | Wu ....................... | B60W 20/50 701/33.7 |
| 2011/0077809 A1* | 3/2011 | Leary ................... | B60L 11/1824 701/22 |
| 2012/0212044 A1* | 8/2012 | Nakamura ............. | B60T 7/042 303/9.62 |

(Continued)

FOREIGN PATENT DOCUMENTS

JP 2009-096340 A 5/2009

*Primary Examiner* — Alex C Dunn
(74) *Attorney, Agent, or Firm* — Dinsmore & Shohl LLP

(57) ABSTRACT

A hybrid vehicle includes an engine, a first MG (motor generator), a second MG, a battery electrically connected to the first MG and the second MG, an engine ECU configured to control the engine, and a hybrid ECU (Electronic Control Unit) configured to control the first MG and the second MG and communicate with the engine ECU. When an abnormality of communication with the engine ECU is not found and a history of an abnormality of the engine main body is not found and electric power generated by the first MG during cranking of the engine is lower than electric power receivable by the battery during MD (Motor Drive) running (fail-safe running) in which the engine is stopped, the hybrid ECU achieves recovery to normal running in which actuation of the engine is permitted, with cranking of the engine by power generation torque of the first MG.

3 Claims, 12 Drawing Sheets

(56) References Cited

U.S. PATENT DOCUMENTS

| | | | |
|---|---|---|---|
| 2014/0081508 A1* | 3/2014 | Iida | B60W 50/0205 |
| | | | 701/29.2 |
| 2014/0163796 A1* | 6/2014 | Omi | B60W 20/50 |
| | | | 701/22 |
| 2014/0184114 A1* | 7/2014 | Omata | H02P 6/08 |
| | | | 318/400.02 |
| 2015/0167615 A1* | 6/2015 | Komuro | B60L 11/12 |
| | | | 290/31 |
| 2015/0217762 A1* | 8/2015 | Cao | B60K 6/445 |
| | | | 477/4 |
| 2016/0001773 A1* | 1/2016 | Kang | F16H 61/00 |
| | | | 701/22 |
| 2016/0125670 A1* | 5/2016 | Amano | B60K 6/387 |
| | | | 701/22 |
| 2016/0137193 A1* | 5/2016 | Johri | B60K 6/547 |
| | | | 477/3 |
| 2016/0272219 A1* | 9/2016 | Ketfi-Cherif | B60W 50/029 |
| 2016/0304084 A1* | 10/2016 | Kawai | B60W 10/08 |

* cited by examiner

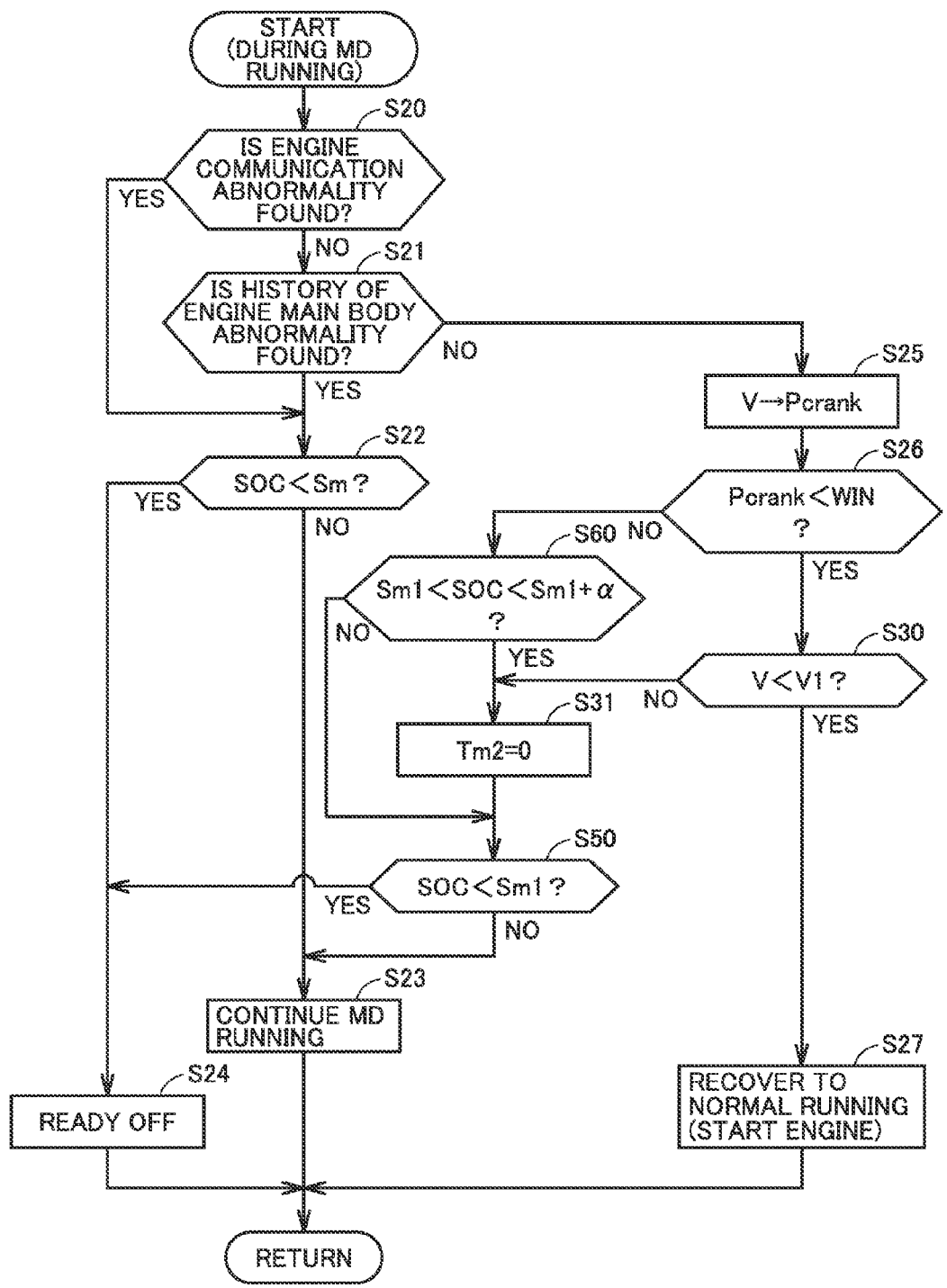

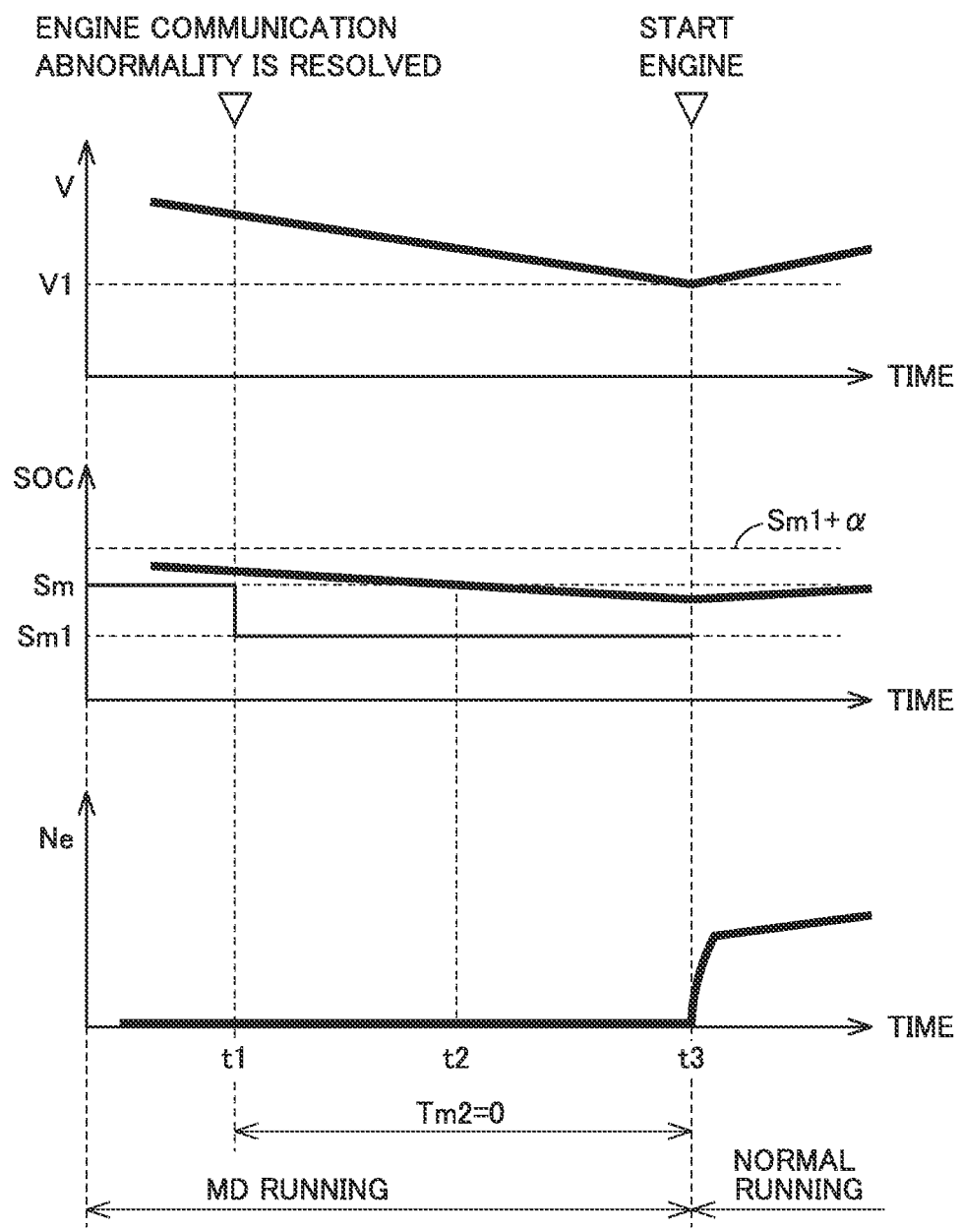

HYBRID VEHICLE

CROSS-REFERENCE TO RELATED APPLICATIONS

This application claims priority to Japanese Patent Application No. 2015-169279 filed on Aug. 28, 2015, the entire contents of which are hereby incorporated by reference.

BACKGROUND

Field

The present disclosure relates to a hybrid vehicle that can run by using the motive power of at least one of an engine and a rotating electric machine (motor generator).

Description of the Background Art

Japanese Patent Laying-Open No. 2009-96340 discloses a hybrid vehicle including an engine, a first MG (motor generator), a second MG, a battery electrically connected to the first MG and the second MG, and an ECU (Electronic Control Unit).

This hybrid vehicle can run by using the motive power of at least one of the engine and the second MG. When such an abnormality that the motive power cannot be output from the second MG occurs during motor running in which the engine is stopped and the hybrid vehicle runs by using the second MG, the ECU starts the engine with cranking by the first MG, on condition that the electric power generated by the first MG during cranking of the engine (hereinafter also referred to as "cranking power") is lower than the electric power receivable by the battery. This can realize fail-safe (limp home) running using the motive power of the engine, while protecting the battery.

SUMMARY

In some hybrid vehicles, an engine ECU for controlling an engine and a hybrid ECU for comprehensively controlling an entire vehicle including the engine by communication with the engine ECU are provided separately. In such hybrid vehicles, the hybrid ECU cannot appropriately control the engine when there is an abnormality of communication between the hybrid ECU and the engine ECU (hereinafter also simply referred to as "communication abnormality") or an abnormality of the engine main body (hereinafter also simply referred to as "engine abnormality"). Therefore, when at least one of the communication abnormality and the engine abnormality occurs, the hybrid ECU switches a control mode of the vehicle from a normal mode in which actuation of the engine is permitted to a fail-safe mode in which the engine is stopped and the vehicle runs by using the motive power of an MG.

In the aforementioned fail-safe mode, the engine is stopped and the vehicle runs by using only the motive power of the second MG. Therefore, when a remaining amount of a battery that supplies the electric power to the second MG decreases, the fail-safe running cannot be continued. Thus, in order to lengthen a fail-safe running distance, it is desirable to start the engine and achieve recovery to the normal mode when the communication abnormality is resolved during the fail-safe mode. At this time, it is assumed that, by applying the technique described in Japanese Patent Laying-Open No. 2009-96340, a condition of the cranking power being lower than the electric power receivable by the battery is added to the conditions for recovery to the normal mode, in order to protect the battery.

However, when the conditions for recovery to the normal mode are merely the conditions that the communication abnormality is resolved and the cranking power is lower than the electric power receivable by the battery, hunting of the control mode may occur due to the engine abnormality. Namely, when the abnormality of the engine main body is found even if the engine communication abnormality is resolved, the control mode may return to the fail-safe mode again immediately after recovery to the normal mode, and the control mode may be frequently switched between the normal mode and the fail-safe mode, which may lead to unstable control mode.

The present disclosure has been made to solve the aforementioned problem, and an object of the present disclosure is to achieve recovery from the fail-safe mode to the normal mode while protecting the battery and suppressing hunting between the normal mode and the fail-safe mode.

(1) A hybrid vehicle according to the present disclosure includes: an engine; a first rotating electric machine; a second rotating electric machine connected to a driving wheel; a planetary gear mechanism configured to mechanically connect the engine, the first rotating electric machine and the second rotating electric machine such that an absolute value of a rotation speed of the first rotating electric machine decreases with a decrease in an absolute value of a rotation speed of the second rotating electric machine during a stop of the engine; a battery electrically connected to the first rotating electric machine and the second rotating electric machine; an engine control unit configured to control the engine; and a hybrid control unit configured to control the first rotating electric machine and the second rotating electric machine, and output an engine command to the engine control unit by communication with the engine control unit. When at least one of an abnormality of communication with the engine control unit and an abnormality of the engine occurs during a first mode in which actuation of the engine is permitted, the hybrid control unit is configured to switch a control mode from the first mode to a second mode in which the engine is stopped. When a predetermined condition is not satisfied during the second mode, the hybrid control unit is configured to maintain the control mode in the second mode, and when the predetermined condition is satisfied during the second mode, the hybrid control unit is configured to start the engine with cranking of the engine by the first rotating electric machine, and recover the control mode to the first mode. The predetermined condition is a condition that the abnormality of communication is not found and a history of the abnormality of the engine is not found and electric power generated by the first rotating electric machine during cranking of the engine is lower than electric power receivable by the battery.

According to such a configuration, when the predetermined condition is satisfied during the second mode, the control mode is recovered to the first mode. The predetermined condition includes the condition that the history of the abnormality of the engine is not found, in addition to the condition that the abnormality of communication with the engine control unit is not found. Therefore, return to the second mode immediately after recovery to the first mode due to the abnormality of the engine is prevented. Furthermore, the predetermined condition includes the condition that the electric power generated by the first rotating electric machine during cranking of the engine is lower than the electric power receivable by the battery. Therefore, in the case as well of cranking the engine by power generation torque of the first rotating electric machine when the control mode is recovered to the first mode, supply of the electric power exceeding the electric power receivable by the battery to the battery is avoided. As a result, it is possible to recover the control mode from the second mode (fail-safe mode) to the first mode (normal mode) while protecting the battery and suppressing hunting between the first mode and the second mode.

(2) In some embodiments, when the predetermined condition is satisfied during the second mode and when a vehicle speed is lower than a threshold vehicle speed, the hybrid control unit is configured to recover the control mode to the first mode. When the predetermined condition is satisfied during the second mode and when the vehicle speed is higher than the threshold vehicle speed, the hybrid control unit is configured to maintain the control mode in the second mode and set output torque of the second rotating electric machine at zero.

In the aforementioned configuration, when the vehicle speed is higher than the threshold vehicle speed during the second mode (while the engine is in a stopped state), the second rotating electric machine connected to the driving wheel rotates at a high rotation speed corresponding to the vehicle speed, and the first rotating electric machine connected to the second rotating electric machine with the planetary gear mechanism interposed therebetween rotates as well. In such a state, a physical impact of the startup of the engine on a powertrain (such as gears in the planetary gear mechanism) is assumed to be great. Thus, in the aforementioned configuration, when the predetermined condition is satisfied during the second mode and the vehicle speed is lower than the threshold vehicle speed, the control mode is recovered to the first mode. As a result, the physical impact of the startup of the engine on the powertrain at the time of recovery to the first mode can be reduced.

Furthermore, in the aforementioned configuration, when the vehicle speed is higher than the threshold vehicle speed even when the predetermined condition is satisfied during the second mode, the control mode is maintained in the second mode and the output torque of the second rotating electric machine is set at zero. As a result, the driving power is stopped and the vehicle speed decreases. Therefore, decrease of the vehicle speed to be lower than the threshold vehicle speed can be promoted and recovery to the first mode can be promoted.

(3) In some embodiments, when the abnormality of communication is not found and when the history of the abnormality of the engine is not found and when the electric power generated by the first rotating electric machine during cranking of the engine is higher than the electric power receivable by the battery during the second mode, the hybrid control unit is configured to maintain the control mode in the second mode, and set output torque of the second rotating electric machine at zero when a remaining amount of the battery is smaller than a threshold remaining amount.

According to such a configuration, when the abnormality of communication with the engine control unit is not found and the history of the abnormality of the engine is not found and the cranking power is higher than the electric power receivable by the battery during the second mode, the control mode is maintained in the second mode. At this time, in view of the fact that the fail-safe running distance may become shorter due to a decrease in remaining amount of the battery, the hybrid control unit sets the output torque of the second rotating electric machine at zero when the remaining amount of the battery is smaller than the threshold remaining amount. As a result, the decrease in remaining amount of the battery is suppressed and the vehicle speed decreases. Since the absolute value of the rotation speed of the second rotating electric machine decreases with the decrease in vehicle speed, the absolute value of the rotation speed of the first rotating electric machine connected to the second rotating electric machine with the planetary gear mechanism interposed therebetween decreases as well. Therefore, the cranking power (an absolute value of a product of the absolute value of the rotation speed of the first rotating electric machine and the power generation torque) decreases. As a result, before the fail-safe running distance becomes shorter due to the decrease in remaining amount of the battery, the cranking power can be decreased to be lower than the electric power receivable by the battery and the control mode can be recovered to the first mode.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11 is a flowchart (No. 6) showing a process procedure by the hybrid ECU.

FIG. 12 is a diagram showing one example of a change in vehicle speed V, SOC and engine rotation speed Ne at the time of recovery from MD running to normal running.

DETAILED DESCRIPTION

Figure 1:
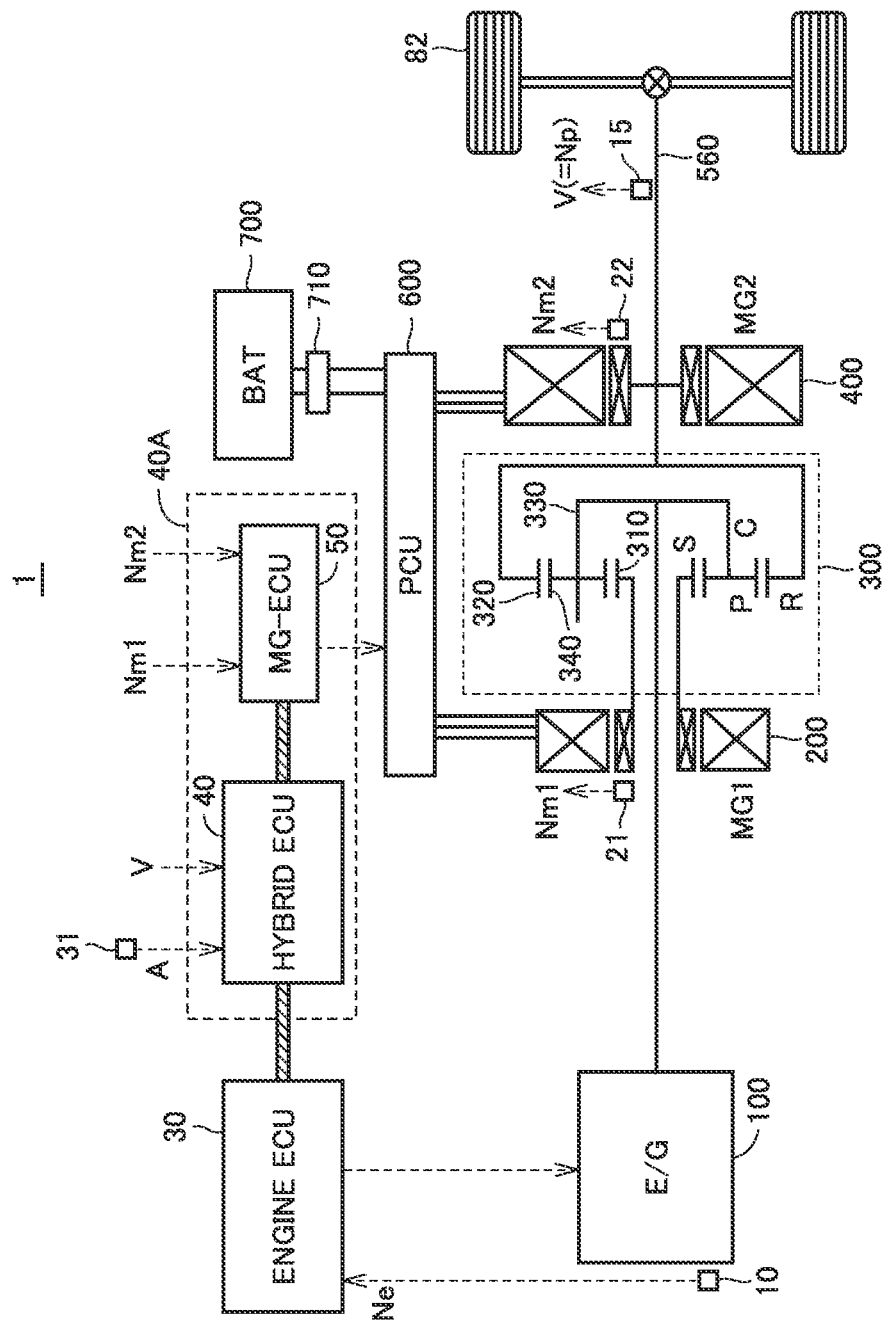
FIG. 1 is an overall block diagram of a vehicle.

An embodiment of the present disclosure will be described hereinafter with reference to the drawings. In the following description, the same components are denoted by the same reference characters. Their names and functions are also the same. Therefore, detailed description of them will not be repeated.

[Overall Configuration of Vehicle]

FIG. 1 is an overall block diagram of a vehicle 1 according to the present embodiment. Vehicle 1 includes an engine 100, a first MG (Motor Generator) 200, a power split device 300, a second MG 400, an output shaft 560, a driving wheel 82, a PCU (Power Control Unit) 600, a battery 700, and an SMR (System Main Relay) 710. Vehicle 1 further includes an engine ECU (Electronic Control Unit) 30, a hybrid ECU 40 and a motor generator ECU (hereinafter also referred to as "MG-ECU") 50.

Vehicle 1 is a hybrid vehicle that runs by using the motive power of at least one of engine 100 and second MG 400. During normal running described below, vehicle 1 can switch the running mode between electric vehicle running (hereinafter referred to as "EV running") in which the motive power of engine 100 is not used and the motive power of second MG 400 is used, and hybrid vehicle running (hereinafter referred to as "HV running") in which the motive power of engine 100 and the motive power of second MG 400 are both used.

Engine 100 is an internal combustion engine that burns fuel and outputs the motive power. Each of first MG 200 and second MG 400 is an AC rotating electric machine and functions both as a motor and as a generator.

In the following description, a rotation speed of engine 100 may be denoted as "engine rotation speed Ne", a rotation speed of first MG 200 may be denoted as "first MG rotation speed Nm1", and a rotation speed of second MG 400 may be denoted as "second MG rotation speed Nm2". In addition, the output torque of engine 100 may be denoted as "engine torque Te", the output torque of first MG 200 may be denoted as "first MG torque Tm1", and the output torque of second MG 400 may be denoted as "second MG torque Tm2".

Power split device 300 is a planetary gear mechanism having a sun gear (S) 310, a ring gear (R) 320, a pinion gear (P) 340 engaged with sun gear (S) 310 and ring gear (R) 320, and a carrier (C) 330 holding pinion gear (P) 340 in a freely rotating and revolving manner. Carrier (C) 330 is coupled to engine 100. Sun gear (S) 310 is coupled to first MG 200. Ring gear (R) 320 is coupled to second MG 400 and driving wheel 82 by output shaft 560.

Figure 2:
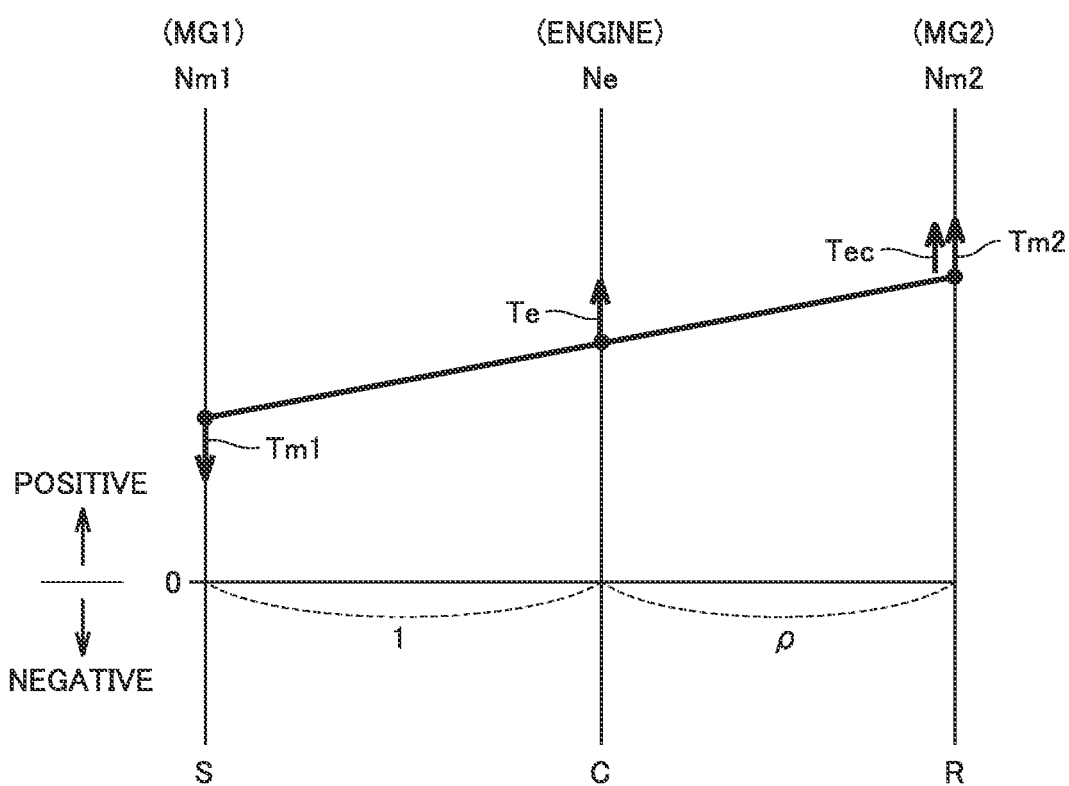
FIG. 2 is a diagram showing one example of a control state in the case of moving forward by HV running during normal running.
Figure 3:
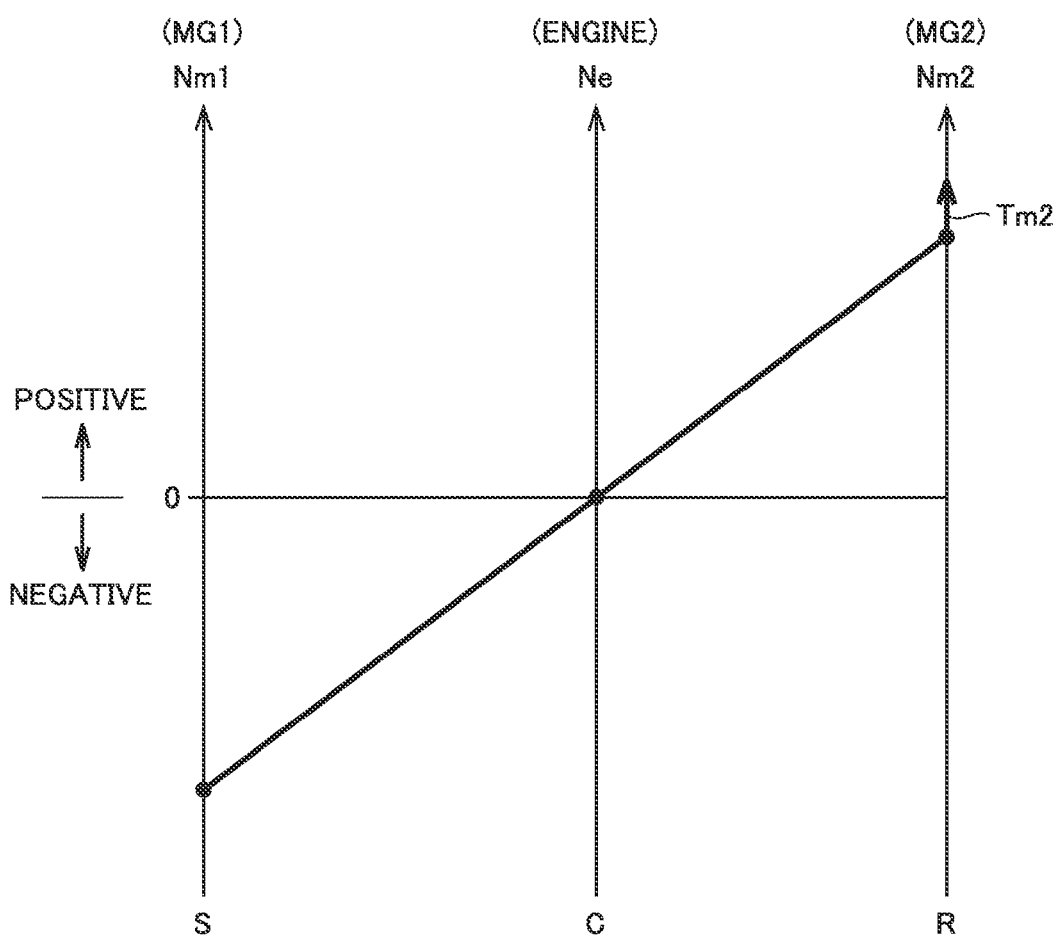
FIG. 3 is a diagram showing one example of a control state in the case of moving forward during MD (Motor Drive) running.

Engine 100, first MG 200 and second MG 400 are mechanically coupled by power split device 300, and thereby, first MG rotation speed Nm1 (rotation speed of sun gear (S) 310), engine rotation speed Ne (rotation speed of carrier (C) 330) and second MG rotation speed Nm2 (rotation speed of ring gear (R) 320) have such a relation that they are connected by a straight line on a nomographic chart of power split device 300 (such a relation that when any two of the rotation speeds are determined, the rest is also determined, which will be hereinafter also referred to as "relation on the nomographic chart"), as shown in FIGS. 2 and 3 described below.

PCU 600 converts high-voltage DC power supplied from battery 700 into AC power, and outputs the AC power to first MG 200 and/or second MG 400. As a result, first MG 200 and/or second MG 400 is/are driven. PCU 600 also converts AC power generated by first MG 200 and/or second MG 400 into DC power, and outputs the DC power to battery 700. As a result, battery 700 is charged. In addition, PCU 600 can also drive second MG 400 by using the electric power generated by first MG 200.

Battery 700 is a secondary battery that stores the high-voltage (e.g., approximately 200 V) DC power for driving first MG 200 and/or second MG 400. Battery 700 is configured to typically include a nickel-metal hydride battery or a lithium ion battery.

SMR 710 is a relay for achieving connection and interruption between battery 700 and an electric system including PCU 600, first MG 200 and second MG 400. When SMR 710 is closed, vehicle 1 enters a running possible state (READY-ON state). When SMR 710 is opened, vehicle 1 enters a running impossible state (READY-OFF state).

Vehicle 1 is further provided with a plurality of sensors for detecting various pieces of information required for control of vehicle 1, such as an engine rotation speed sensor 10, an output shaft rotation speed sensor 15, resolvers 21 and 22, and an accelerator position sensor 31. Engine rotation speed sensor 10 detects engine rotation speed Ne, and outputs the result of detection to engine ECU 30. Resolver 21 detects first MG rotation speed Nm1, and outputs the result of detection to MG-ECU 50. Resolver 22 detects second MG rotation speed Nm2, and outputs the result of detection to MG-ECU 50. Output shaft rotation speed sensor 15 detects a rotation speed Np of output shaft 560 as a vehicle speed V, and outputs the result of detection to hybrid ECU 40. Accelerator position sensor 31 detects an accelerator pedal operation amount A by the user, and outputs the result of detection to hybrid ECU 40.

Each of engine ECU 30, hybrid ECU 40 and MG-ECU 50 has a not-shown CPU (Central Processing Unit) and a not-shown memory embedded therein, and performs the prescribed computation processing based on the information stored in the memory and the information provided from each sensor. Although hybrid ECU 40 and MG-ECU 50 are shown as separate components in FIG. 1, hybrid ECU 40 and MG-ECU 50 can also be integrated into one ECU 40A.

Hybrid ECU 40 is connected to engine ECU 30 and MG-ECU 50 by a communication line. By mutual communication with engine ECU 30 and with MG-ECU 50, hybrid ECU 40 comprehensively controls engine 100, first MG 200 and second MG 400.

More specifically, based on accelerator pedal operation amount A provided from accelerator position sensor 31, vehicle speed V provided from output shaft rotation speed sensor 15 and the like, hybrid ECU 40 calculates the driving power requested for vehicle 1 by the user (hereinafter also referred to as "requested driving power Preq"). Hybrid ECU 40 generates an engine command signal, a first MG command signal and a second MG command signal in consideration of a state of battery 700 and the like, such that calculated requested driving power Preq is transmitted to driving wheel 82. Then, hybrid ECU 40 outputs the engine command signal to engine ECU 30, and outputs the first MG command signal and the second MG command signal to MG-ECU 50.

Hybrid ECU 40 calculates an SOC (State Of Charge) indicating a remaining amount of battery 700. Generally, the SOC is expressed in a ratio of a remaining capacity to a full-charge capacity. As a method for calculating the SOC, various known methods can be used, such as a method for calculating the SOC by using a relation between an output voltage and the SOC of battery 700, and a method for calculating the SOC by using a summed value of a current flowing through battery 700. Hereinafter, the SOC of battery 700 will be also simply denoted as "SOC".

Based on the SOC and the like, hybrid ECU 40 sets electric power WIN (unit: watt) receivable by battery 700. For example, hybrid ECU 40 sets receivable electric power WIN such that receivable electric power WIN has a smaller value as the SOC becomes greater. Similarly, based on the SOC and the like, hybrid ECU 40 sets electric power WOUT outputtable by battery 700. For example, hybrid ECU 40 sets outputtable electric power WOUT such that outputtable electric power WOUT has a smaller value as the SOC becomes smaller.

Engine ECU 30 outputs the information indicating a state of engine 100 (such as, for example, engine rotation speed Ne detected by engine rotation speed sensor 10) to hybrid ECU 40 at prescribed cycles. In addition, engine ECU 30 controls an output (specifically, a degree of opening of a throttle, an ignition timing, an amount of fuel injection and the like) of engine 100 in accordance with the engine command signal provided from hybrid ECU 40.

MG-ECU 50 outputs the information indicating states of first MG 200 and second MG 400 (such as, for example, first MG rotation speed Nm1 and second MG rotation speed Nm2 detected by resolvers 21 and 22) to hybrid ECU 40 at prescribed cycles. In addition, MG-ECU 50 controls outputs (specifically, an amount of current and the like) of first MG 200 and second MG 400 in accordance with the first MG command signal and the second MG command signal provided from hybrid ECU 40, respectively.

[Switching from Normal Running to Fail-Safe Running (MD Running)]

Hybrid ECU 40 can cause vehicle 1 to run in any one control mode of a normal mode and a fail-safe mode.

The normal mode is a mode in which vehicle 1 runs while performing switching between the EV running in which engine 100 is stopped and the HV running in which engine 100 is actuated. In other words, the normal mode is a mode in which actuation of engine 100 is permitted. Hereinafter, running in the normal mode will be denoted as "normal running".

The fail-safe mode is a mode in which engine 100 is stopped and vehicle 1 runs by using the motive power of second MG 400 in the event of such an abnormality that engine 100 cannot be appropriately controlled in accordance with the user's request. In other words, the fail-safe mode is a mode in which engine 100 is stopped. Hereinafter, running in the fail-safe mode will be denoted as "fail-safe running" or "MD (Motor Drive) running".

FIG. 2 is a diagram showing, on the nomographic chart of power split device 300, one example of a control state of engine 100, first MG 200 and second MG 400 in the case of moving forward by the HV running during the normal running. As described above, first MG rotation speed Nm1, engine rotation speed Ne and second MG rotation speed Nm2 have such a relation that they are connected by a straight line on the nomographic chart.

In the case of moving forward by the HV running during the normal running, both of second MG torque Tm2 and engine direct torque Tec are transmitted to output shaft 560. Engine direct torque Tec herein refers to the torque in the positive direction transmitted from engine 100 to ring gear (R) 320 of power split device 300 (i.e., output shaft 560) by using first MG torque Tm1 as reaction force.

FIG. 3 is a diagram showing, on the nomographic chart of power split device 300, one example of a control state of engine 100, first MG 200 and second MG 400 in the case of moving forward during the MD running. In the case of moving forward during the MD running, engine 100 is stopped and engine rotation speed Ne becomes zero. In addition, second MG torque Tm2 is transmitted to output shaft 560, such that second MG 400 is rotated in the positive direction. As shown in FIG. 3, while engine 100 is in a stopped state, second MG 400 is rotated in the positive direction and thereby first MG 200 is rotated in the negative direction, based on the relation on the nomographic chart.

Figure 4:
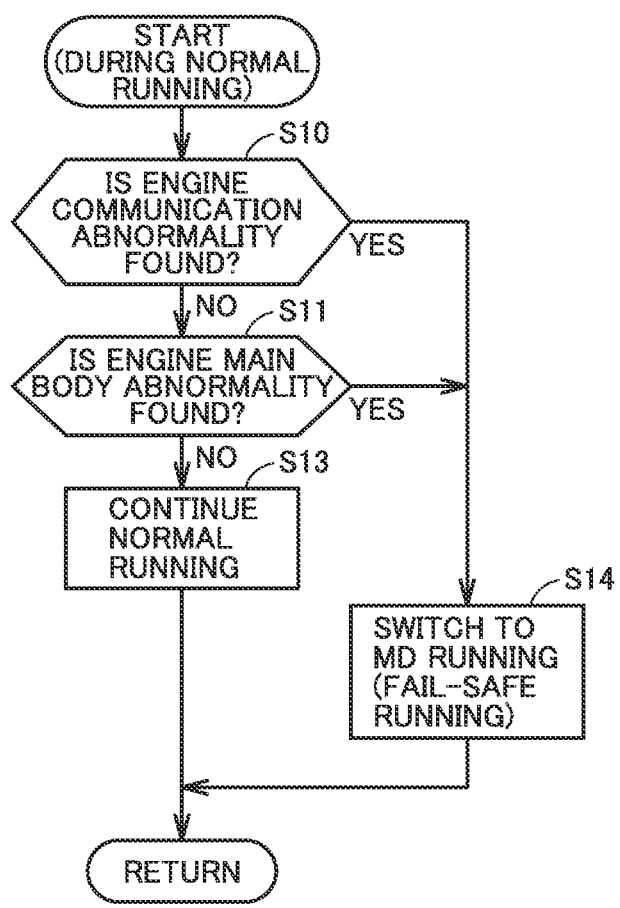
FIG. 4 is a flowchart (No. 1) showing a process procedure by a hybrid ECU.

FIG. 4 is a flowchart showing a process procedure when hybrid ECU 40 performs switching from the normal running to the fail-safe running. This flowchart is repeatedly executed at prescribed cycles.

In step (hereinafter abbreviated as "S") 10, hybrid ECU 40 determines whether or not an abnormality of communication with engine ECU 30 (hereinafter also referred to as "engine communication abnormality") is found. For example, when there is no response from engine ECU 30 to the signal output to engine ECU 30, hybrid ECU 40 determines that the engine communication abnormality is found.

In S11, hybrid ECU 40 determines whether or not an abnormality of a main body of engine 100 (hereinafter also referred to as "engine main body abnormality" or simply "engine abnormality") is found. For example, when hybrid ECU 40 receives the information indicating the abnormality of the main body of engine 100 from engine ECU 30, hybrid ECU 40 determines that the engine main body abnormality is found. The abnormality of the main body of engine 100 herein includes, for example, seizure (overheating) of engine 100, an abnormality of engine rotation speed sensor 10, an abnormality of a not-shown cam angle sensor and a not-shown engine water temperature sensor, and the like.

If the engine communication abnormality is not found (NO in S10) and the engine main body abnormality is not found (NO in S11), hybrid ECU 40 maintains the control mode in the normal mode and continues the normal running in S13.

On the other hand, if at least one of the engine communication abnormality and the engine main body abnormality is found (YES in S10 or YES in S11), hybrid ECU 40 switches the control mode from the normal mode to the fail-safe mode and switches the running mode from the normal running to the fail-safe running (MD running) in S14, because it is assumed that there is such an abnormality that engine 100 cannot be appropriately controlled in accordance with the user's request.

[Recovery from Fail-Safe Running (MD Running) to Normal Running]

In the case of the MD running of vehicle 1 having the configuration described above, engine 100 is stopped and vehicle 1 runs by using only the motive power of second MG 400. Therefore, when the remaining amount of battery 700 that supplies the electric power to second MG 400 decreases, a distance that can be traveled by the fail-safe running may become shorter. Therefore, in order to lengthen the distance that can be traveled by the fail-safe running, it is desirable to start engine 100 and achieve recovery to the normal running when the engine communication abnormality is resolved during the MD running.

However, when a condition for recovery from the MD running to the normal running is merely a condition that the communication abnormality is resolved, it is concerned that the following problems may occur.

First, hunting between the normal running (normal mode) and the MD running (fai)-safe mode) may occur due to the engine main body abnormality. Namely, when the engine main body abnormality is found even if the engine communication abnormality is resolved, the running mode returns to the MD running again immediately after recovery to the normal running, and the running mode is frequently switched between the normal running (normal mode) and the MD running (fail-safe mode), which leads to unstable control mode.

Next, the electric power exceeding receivable electric power WIN may be supplied to battery 700 due to startup of engine 100 at the time of recovery from the MD running to the normal running. Namely, when engine 100 is started during the MD running, engine 100 needs to be cranked by the power generation torque of first MG 200 (see FIG. 6 described below). However, when the electric power generated by first MG 200 during cranking of engine 100 (hereinafter also referred to as "cranking power Pcrank") is higher than electric power WIN receivable by battery 700, the electric power exceeding receivable electric power WIN may be supplied from first MG 200 to battery 700 during cranking of engine 100, which may degrade battery 700.

Thus, when such conditions that the engine communication abnormality is not found and a history of the engine main body abnormality is not found and cranking power Pcrank is lower than electric power WIN receivable by battery 700 are satisfied during the MD running, hybrid ECU 40 according to the present embodiment recovers the running mode from the MD running to the normal running. As a result, the return to the MD running due to the engine main body abnormality immediately after recovery to the normal running is prevented. Furthermore, in the case as well of cranking engine 100 by the power generation torque of first MG 200 at the time of recovery to the normal running, supply of the electric power exceeding receivable electric power WIN to battery 700 is avoided. As a result, recovery from the MD running to the normal running can be achieved while protecting battery 700 and suppressing hunting between the normal running (normal mode) and the MD running (fail-safe mode).

Figure 5:
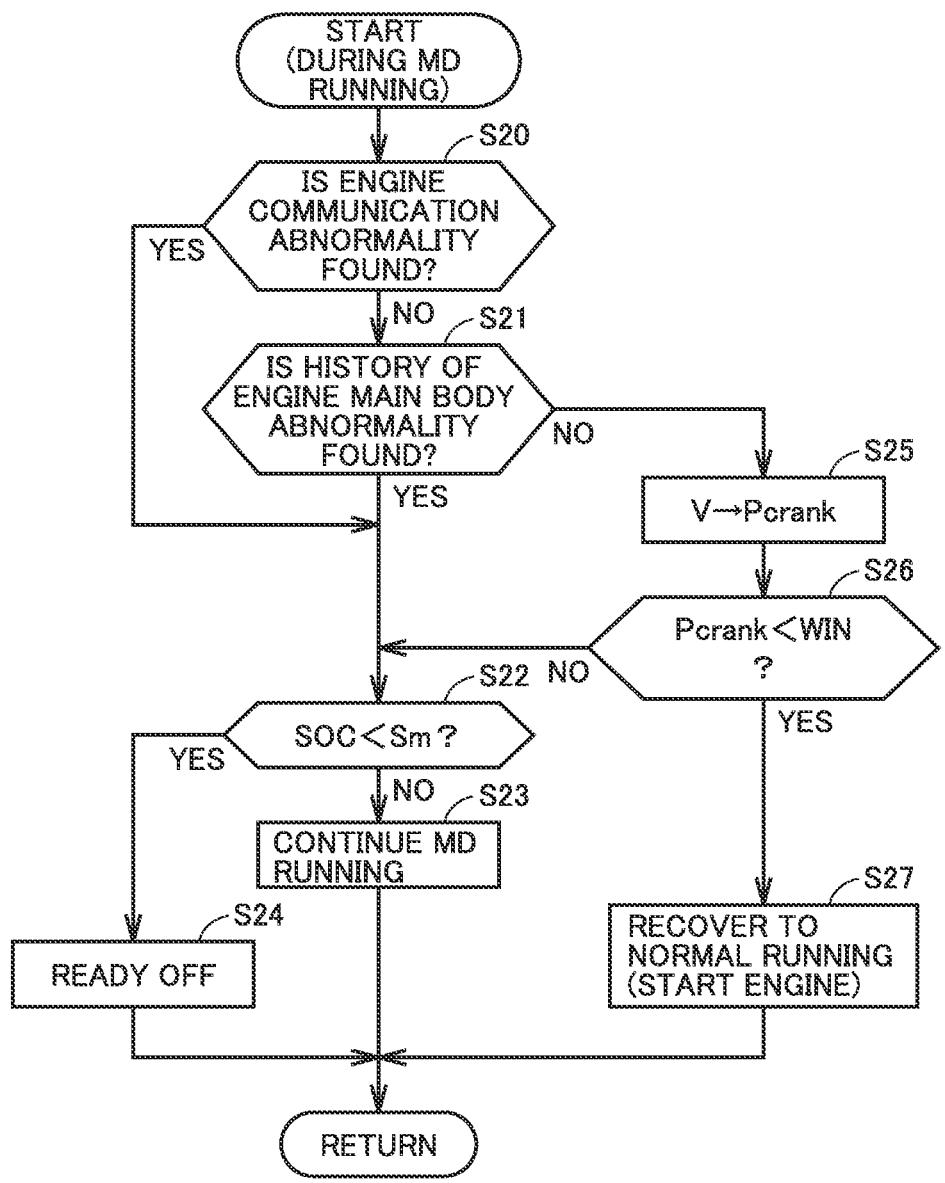
FIG. 5 is a flowchart (No. 2) showing a process procedure by the hybrid ECU.

FIG. 5 is a flowchart showing a process procedure when hybrid ECU 40 recovers the running mode from the MD running to the normal running. This flowchart is repeatedly executed at prescribed cycles during the MD running.

In S20, hybrid ECU 40 determines whether or not the engine communication abnormality is found. Since the processing in S20 is the same as the processing in S10 shown in FIG. 4 described above, detailed description will not be repeated here.

In S21, hybrid ECU 40 determines whether or not the history of the engine main body abnormality is found. Namely, hybrid ECU 40 determines whether or not a history of reception, from engine ECU 30, of the information indicating the abnormality of the main body of engine 100 is found.

If the engine communication abnormality is found (YES in S20) or if the history of the engine main body abnormality is found (YES in S21), hybrid ECU 40 continues the MD running in S22 to S24 until the SOC falls below a lower limit value Sm. Specifically, in S22, hybrid ECU 40 determines whether or not the SOC falls below lower limit value Sm. If the SOC is higher than lower limit value Sm (NO in S22), hybrid ECU 40 continues the MD running in S23. If the SOC is lower than lower limit value Sm (YES in S22), hybrid ECU 40 opens SMR 710 and brings about the READY-OFF state in S24.

Lower limit value Sm is a lower limit value of an SOC region where the MD running can be continued. Lower limit value Sm is set at the electric power that allows cranking of engine 100 a plurality of times by the discharge torque (electric power discharged from battery 700 to first MG 200) of first MG 200. Therefore, even when the READY-OFF state is brought about, the electric power corresponding to lower limit value Sm that allows cranking a plurality of times is left in battery 700. Therefore, for example, even when the user cranks engine 100 by using the discharge torque of first MG 200 after the abnormality is resolved, cranking can be performed a plurality of times. On the assumption that fuel exhaustion of engine 100 would occur, the number of times at which engine 100 can be cranked is set at the number of times at which the user can become aware of the fuel exhaustion. Namely, although engine 100 is not started during fuel exhaustion even when cranking is performed, it is assumed that the user repeatedly performs cranking for a while without becoming aware of fuel exhaustion. The user can become aware of fuel exhaustion when engine 100 is not started even when cranking is performed a plurality of times.

On the other hand, if the engine communication abnormality is not found (NO in S20) and the history of the engine main body abnormality is not found (NO in S21), hybrid ECU 40 calculates cranking power Pcrank based on vehicle speed V in S25.

Figure 6:
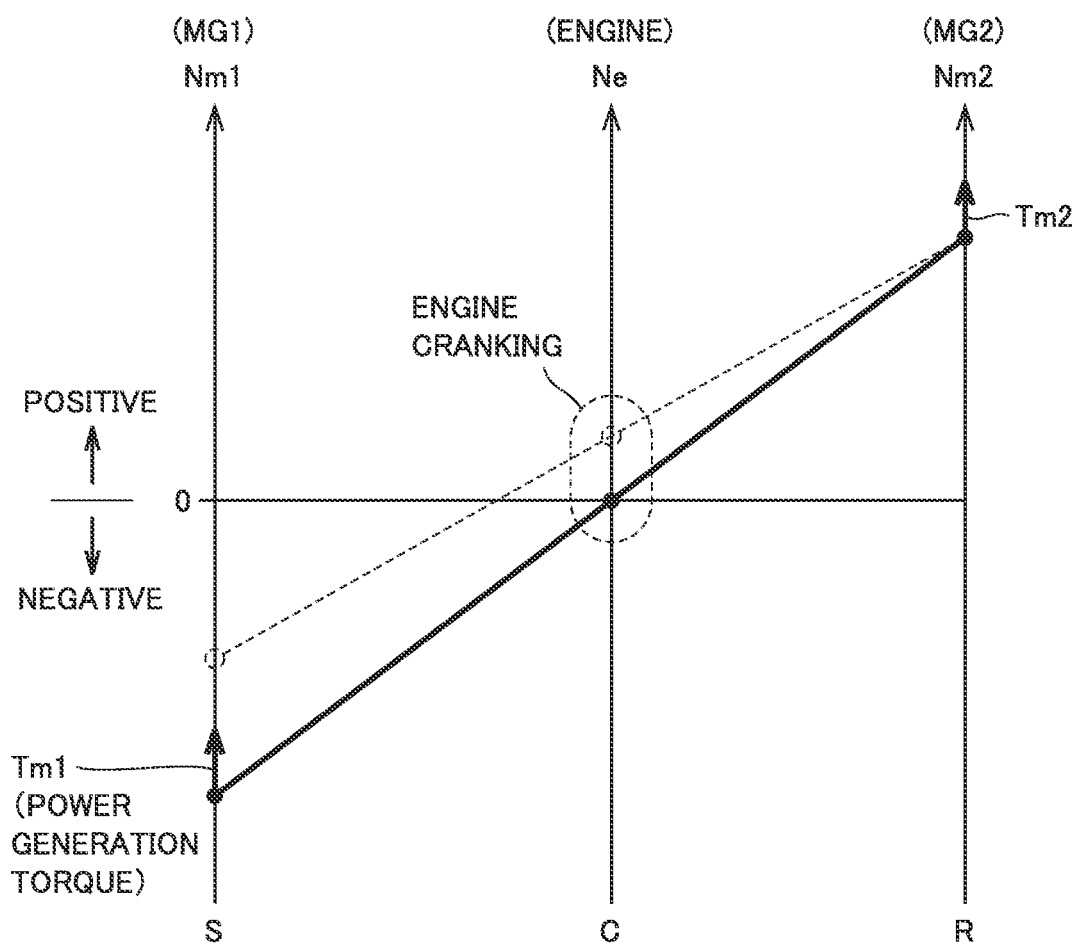
FIG. 6 is a diagram showing one example of a control state when an engine is cranked during MD running.

FIG. 6 is a diagram showing, on the nomographic chart of power split device 300, one example of a control state of engine 100, first MG 200 and second MG 400 when engine 100 is cranked by the power generation torque of first MG 200 during the MD running.

During forward movement by the MD running, engine 100 is stopped and second MG 400 is rotated in the positive direction, and thus, first MG 200 is rotated in the negative direction based on the relation on the nomographic chart. In the case of recovery from this state to the normal running, hybrid ECU 40 causes first MG 200 to generate the electric power such that first MG torque Tm1 functions in the positive direction, and by the torque output by first MG 200 at this time (hereinafter also referred to as "power generation torque"), engine 100 is cranked such that a prescribed rotation speed is reached. When engine rotation speed Ne rises to the prescribed rotation speed by cranking, hybrid ECU 40 outputs a command signal to engine ECU 30 such that ignition control of engine 100 is started.

The electric power generated by first MG 200 during cranking of engine 100, i.e., cranking power Pcrank, is expressed in an absolute value ($=|Tm1 \times Nm1|$) of a product of first MG rotation speed Nm1 and the power generation torque. Therefore, assuming that the power generation torque is constant, cranking power Pcrank is proportional to an absolute value of first MG rotation speed Nm1. During the MD running, the absolute value of first MG rotation speed Nm1 is proportional to an absolute value of second MG rotation speed Nm2 based on the relation on the nomographic chart. In addition, the absolute value of second MG rotation speed Nm2 corresponds to vehicle speed V. In view of the foregoing point, hybrid ECU 40 calculates cranking power Pcrank based on vehicle speed V.

Figure 7:
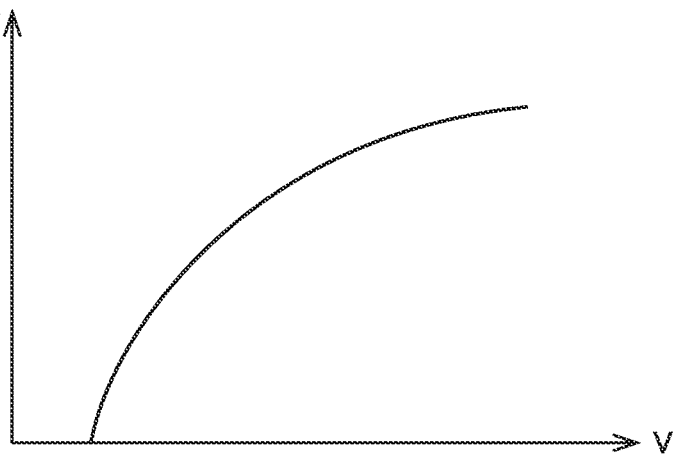
FIG. 7 is a diagram showing a correspondence relation between vehicle speed V and cranking power Pcrank.

FIG. 7 is a diagram showing a correspondence relation between vehicle speed V and cranking power Pcrank. As shown in FIG. 7, as vehicle speed V becomes higher, cranking power Pcrank becomes higher. Hybrid ECU 40 prestores the correspondence relation shown in FIG. 7 as a map, for example, and calculates cranking power Pcrank corresponding to actual vehicle speed V by referring to this map.

Referring again to FIG. 5, after calculating cranking power Pcrank in S25, hybrid ECU 40 determines in S26 whether or not cranking power Pcrank is lower than electric power WIN receivable by battery 700.

If cranking power Pcrank is higher than receivable electric power WIN (NO in S26), hybrid ECU 40 moves the process to S22 to S24 described above and continues the MD running such that the SOC falls below lower limit value Sm.

On the other hand, if cranking power Pcrank is lower than receivable electric power WIN (YES in S26), hybrid ECU 40 recovers the running mode to the normal running in S27. At this time, hybrid ECU 40 starts engine 100 with cranking of engine 100 by the power generation torque of first MG 200.

As described above, when the predetermined conditions are satisfied during the MD running, hybrid ECU 40 according to the present embodiment recovers the running mode from the MD running to the normal running. In addition to the condition that the engine communication abnormality is not found (NO in S20), the predetermined conditions include the condition that the history of the engine main body abnormality is not found (NO in S21). Therefore, return to the MD running due to the engine main body abnormality immediately after recovery to the normal running is prevented. Furthermore, the predetermined conditions include the condition that cranking power Pcrank (electric power generated by first MG 200 during cranking of engine 100) is lower than electric power WIN receivable by battery 700. Therefore, in the case as well of cranking engine 100 by the power generation torque of first MG 200 at the time of recovery to the normal running, supply of the electric power exceeding electric power WIN receivable by battery 700 to battery 700 is avoided. As a result, recovery from the MD running to the normal running can be achieved while protecting battery 700 and suppressing hunting between the normal running (normal mode) and the MD running (fail-safe mode).

First Modification

In the embodiment described above, when such conditions that the engine communication abnormality is not found and the history of the engine main body abnormality is not found and cranking power Pcrank is lower than electric power WIN receivable by battery 700 (hereinafter also referred to as "basic conditions") are satisfied during the MD running, recovery to the normal running is achieved.

However, it is concerned that an excessive load is applied to a powertrain (such as, for example, the gears in power split device 300) of vehicle 1 when the running mode is recovered to the normal running with vehicle speed V being high. Namely, in vehicle 1, when vehicle speed V is high during the MD running (while engine 100 is in a stopped state), second MG 400 connected to driving wheel 82 is also rotating in the positive direction at high speed, and based on the relation on the nomographic chart, first MG 200 is also rotating in the negative direction at high speed. When engine 100 is started in such a state in order to achieve recovery to the normal running, a physical impact of the startup of engine 100 on the powertrain of vehicle 1 is assumed to be great.

Thus, when the above-described basic conditions are satisfied during the MD running, hybrid ECU 40 according to the present modification further determines whether or not vehicle speed V is lower than a threshold vehicle speed V1. Then, when the above-described basic conditions are satisfied and vehicle speed V is lower than threshold vehicle speed V1, hybrid ECU 40 recovers the running mode to the normal running. As a result, the physical impact of the startup of engine 100 on the powertrain of vehicle 1 at the time of recovery to the normal running can be reduced. On the other hand, when vehicle speed V is higher than threshold vehicle speed V1 even if the above-described basic conditions are satisfied, hybrid ECU 40 maintains the MD running and sets second MG torque Tm2 at zero. As a result, the driving power is stopped and vehicle speed V decreases. Therefore, a decrease in vehicle speed V to be lower than threshold vehicle speed V1 can be promoted and recovery to a first mode can be promoted. Since the remaining structure, function and processing are the same as those in the embodiment described above, detailed description will not be repeated here.

Figure 8:
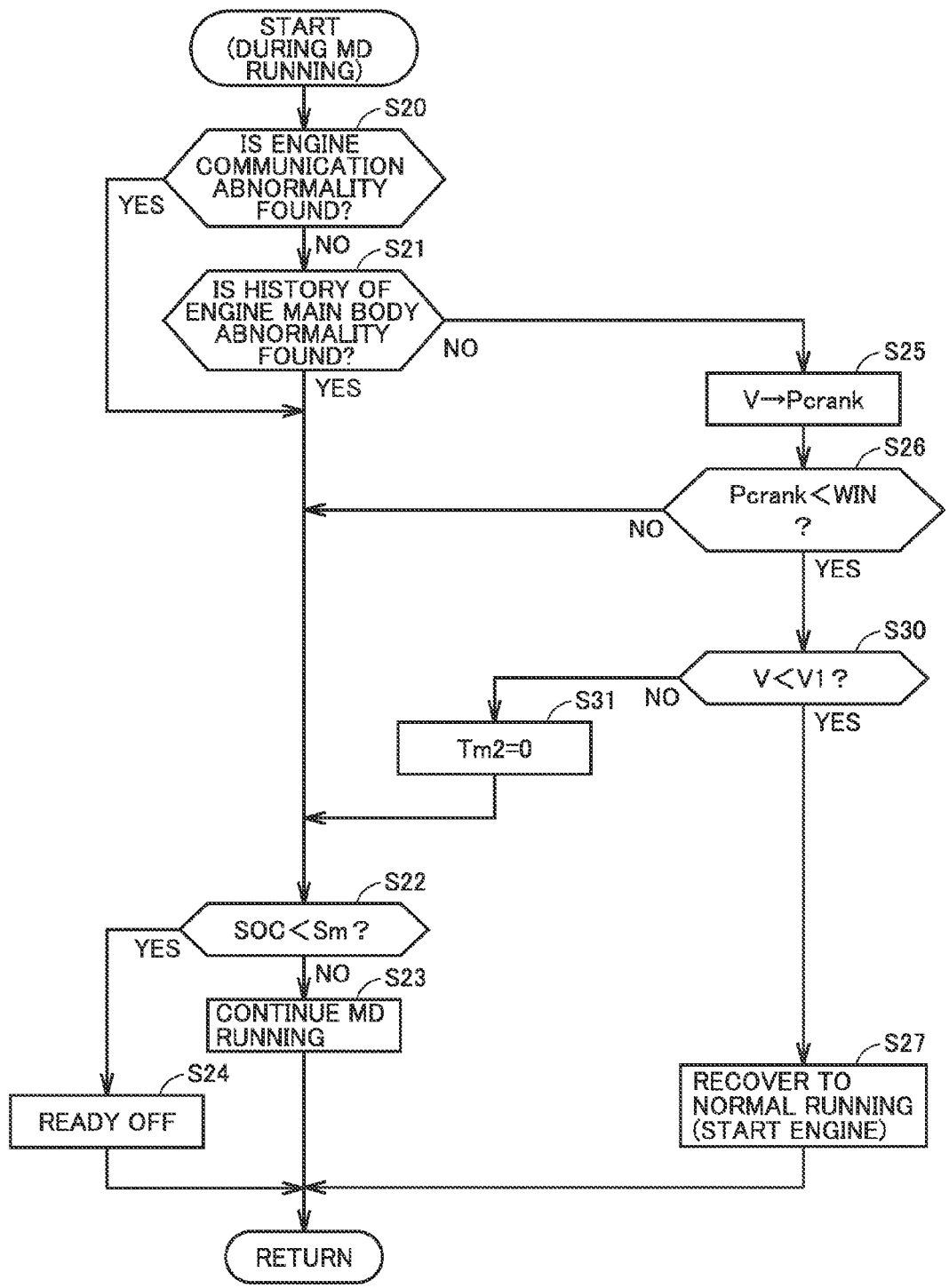
FIG. 8 is a flowchart (No. 3) showing a process procedure by the hybrid ECU.

FIG. 8 is a flowchart showing a process procedure when hybrid ECU 40 according to the first modification recovers the running mode from the MD running to the normal running. Of the steps shown in FIG. 8, the steps denoted by the same numbers as those of the steps shown in FIG. 5 described above have already been described, and thus, detailed description will not be repeated here.

If the above-described basic conditions are satisfied, i.e., if the engine communication abnormality is not found (NO in S20) and the history of the engine main body abnormality is not found (NO in S21) and cranking power Pcrank is lower than WIN (YES in S26), during the MD running, hybrid ECU 40 determines in S30 whether or not vehicle speed V is lower than threshold vehicle speed V1. The magnitude of threshold vehicle speed V1 is set in consideration of the physical impact of the startup of engine 100 on the powertrain of vehicle 1.

If vehicle speed V is lower than threshold vehicle speed V1 (YES in S30), hybrid ECU 40 recovers the running mode to the normal running in S27 because the physical impact of the startup of engine 100 on the powertrain is considered to be small.

On the other hand, if vehicle speed V is higher than threshold vehicle speed V1 (NO in S30), hybrid ECU 40 sets second MG torque Tm2 at zero in S31 because the physical impact of the startup of engine 100 on the powertrain of vehicle 1 is considered to be great. As a result, the driving power is stopped and a decrease in vehicle speed V to be lower than threshold vehicle speed V1 is promoted. Thereafter, hybrid ECU 40 moves the process to S22 to S24 described above and continues the MD running until the SOC falls below lower limit value Sm.

As described above, when the above-described basic conditions are satisfied during the MD running and vehicle speed V is lower than threshold vehicle speed V1, hybrid ECU 40 according to the present modification recovers the running mode to the normal running. As a result, the physical impact of the startup of engine 100 on the powertrain of vehicle 1 at the time of recovery to the normal running can be reduced. On the other hand, when vehicle speed V is higher than threshold vehicle speed V1 even if the above-described basic conditions are satisfied, hybrid ECU 40 maintains the MD running and sets second MG torque Tm2 at zero. As a result, the driving power is stopped and vehicle speed V decreases. Therefore, a decrease in vehicle speed V to be lower than threshold vehicle speed V1 can be promoted and recovery to the first mode can be promoted.

Second Modification

In the embodiment described above, when cranking power Pcrank is higher than receivable electric power WIN even if the engine communication abnormality is not found and the history of the engine main body abnormality is not found, the MD running is continued without recovery to the normal running.

However, if the state of cranking power Pcrank being higher than receivable electric power WIN continues, there is a possibility that the SOC continues to decrease due to the continuation of the MD running, and the READY-OFF state is brought about and the fail-safe running cannot be continued (i.e., the fail-safe running distance becomes shorter) at the time point when the SOC falls below lower limit value Sm.

Thus, when the engine communication abnormality is not found and the history of the engine main body abnormality is not found and cranking power Pcrank is higher than receivable electric power WIN during the MD running, hybrid ECU 40 according to a second modification continues the MD running, and sets second MG torque Tm2 at zero when the SOC approaches lower limit value Sm (specifically, when the SOC falls below a threshold value (=Sm+α) higher than lower limit value Sm by a prescribed value α (α>0)). By setting second MG torque Tm2 at zero, supply of the electric power from battery 700 to second MG 400 is stopped, and thus, a decrease in SOC is suppressed, and vehicle speed V decreases because the driving power is stopped. Since the absolute value of second MG rotation speed Nm2 decreases with the decrease in vehicle speed V, the absolute value of first MG rotation speed Nm1 also decreases based on the relation on the nomographic chart. As a result, cranking power Pcrank (=the absolute value of the product of first MG rotation speed Nm1 and power generation torque Tm1) is decreased. Therefore, before the SOC falls below lower limit value Sm, cranking power Pcrank can be decreased to be lower than receivable electric power WIN and recovery to the normal running can be achieved. The remaining structure, function and processing are the same as those in the embodiment described above.

Figure 9:
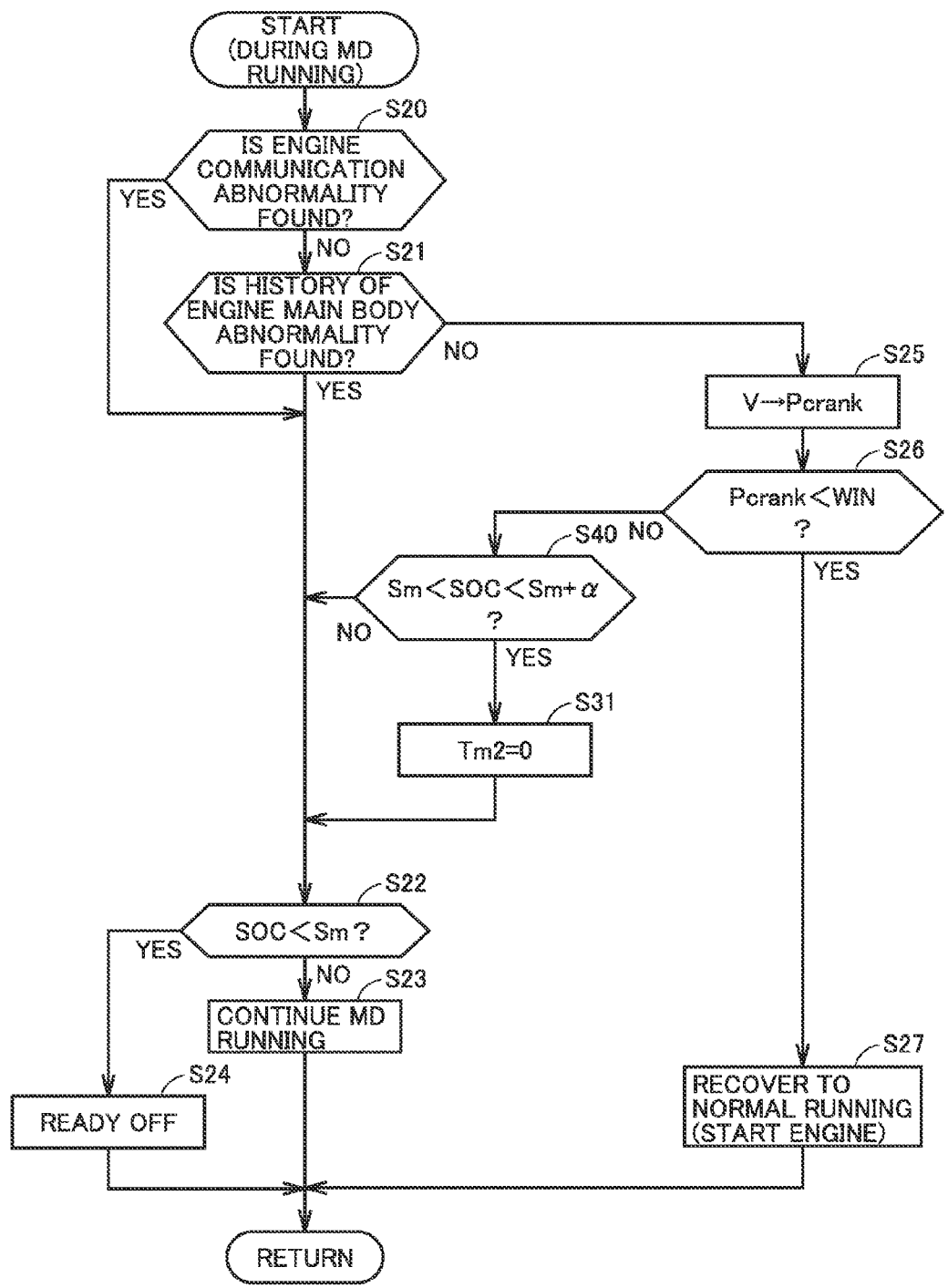
FIG. 9 is a flowchart (No. 4) showing a process procedure by the hybrid ECU.

FIG. 9 is a flowchart showing a process procedure when hybrid ECU 40 according to the second modification recovers the running mode from the MD running to the normal running. Of the steps shown in FIG. 9, the steps denoted by the same numbers as those of the steps shown in FIGS. 5 and 8 described above have already been described, and thus, detailed description will not be repeated here.

If the engine communication abnormality is not found (NO in S20) and the history of the engine main body abnormality is not found (NO in S21) and cranking power Pcrank is higher than receivable electric power WIN (NO in S26) during the MD running, hybrid ECU 40 determines in S40 whether or not the SOC is higher than lower limit value Sm and lower than the aforementioned threshold value (=Sm+α).

If the SOC is higher than the threshold value (=Sm+α) (NO in S40), hybrid ECU 40 moves the process to S22 and S23 described above and continues the MD running without setting second MG torque Tm2 at zero. As a result, vehicle 1 can run in the fail-safe mode while generating the torque corresponding to requested driving power Preq from second MG 400.

On the other hand, if the SOC is lower than the threshold value (=Sm+α) (YES in S40), hybrid ECU 40 sets second MG torque Tm2 at zero and promotes a decrease in cranking power Pcrank in S31, because there is a possibility that the SOC decreases to lower limit value Sm and the fail-safe running cannot be continued. As a result, recovery to the normal running can be promoted while causing vehicle 1 to run in the fail-safe mode through inertia.

As described above, when the engine communication abnormality is not found and the history of the engine main body abnormality is not found and cranking power Pcrank is higher than receivable electric power WIN during the MD running, hybrid ECU 40 according to the second modification continues the MD running, and sets second MG torque Tm2 at zero when the SOC approaches lower limit value Sm. As a result, a decrease in SOC is suppressed and cranking power Pcrank is decreased with a decrease in vehicle speed V. Therefore, before the SOC falls below lower limit value Sm, cranking power Pcrank can be decreased to be lower than receivable electric power WIN and recovery to the normal running can be achieved.

Third Modification

In the embodiment described above, when the SOC falls below lower limit value Sm during the MD running, the READY-OFF state is brought about. As described above, on the assumption that fuel exhaustion of engine 100 would occur, lower limit value Sm is set at a value that allows cranking a plurality of times by the discharge torque of first MG 200.

However, in such a situation that recovery to the normal running is awaited because the engine communication abnormality has been resolved but cranking power Pcrank is higher than receivable electric power WIN during the MD running, there is a low possibility that engine 100 is in a stopped state due to fuel exhaustion. Therefore, the necessity to assume fuel exhaustion of engine 100 is low.

Thus, in such a situation that recovery to the normal running is awaited because the engine communication abnormality has been resolved but cranking power Pcrank is higher than receivable electric power WIN during the MD running, hybrid ECU 40 according to a third modification changes lower limit value Sm to a lower limit value Sm1 lower than lower limit value Sm, thereby expanding the SOC region where the MD running can be continued. Since the remaining structure, function and processing are the same as those in the second modification described above, detailed description will not be repeated here.

Figure 10:
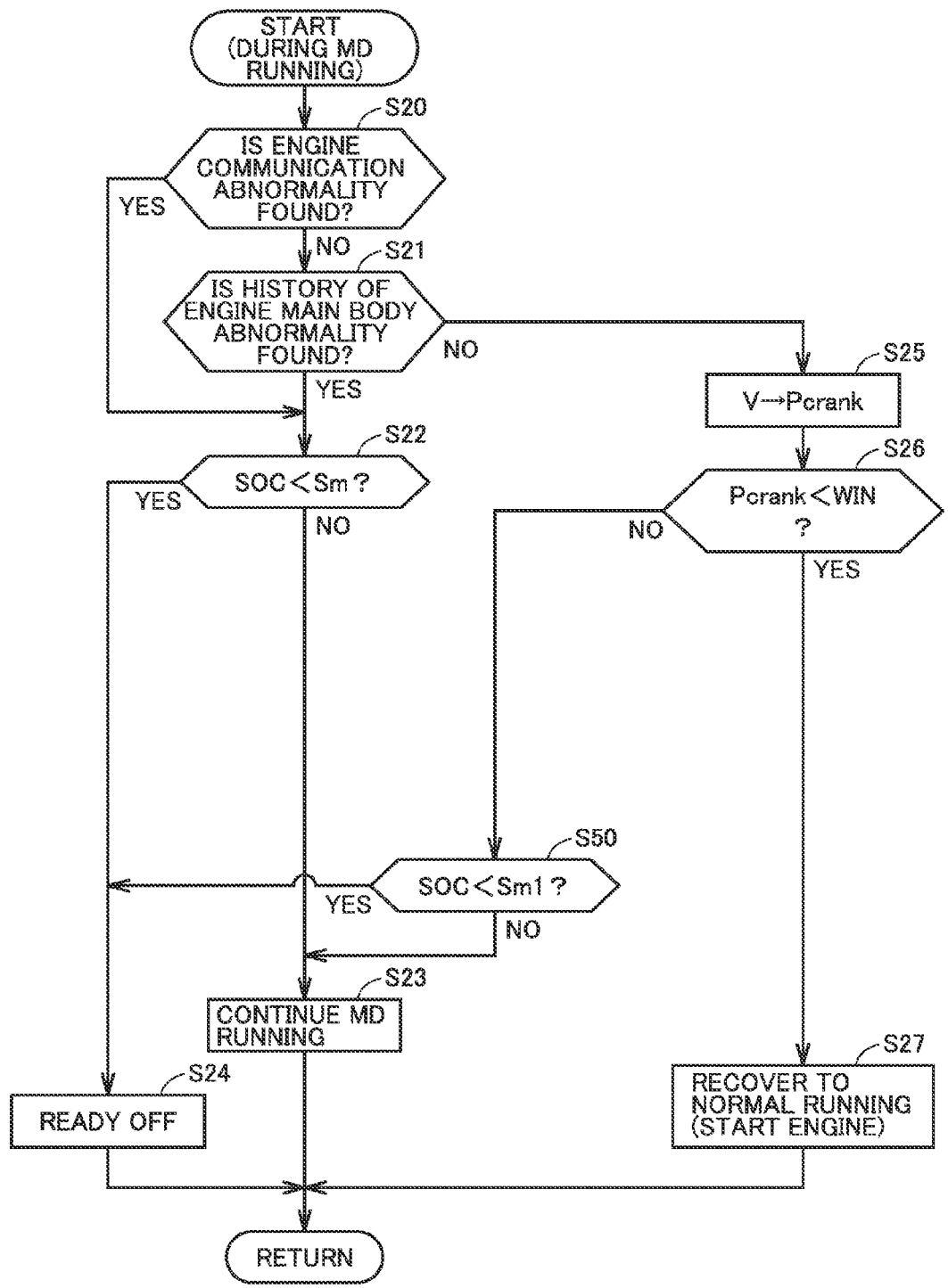
FIG. 10 is a flowchart (No. 5) showing a process procedure by the hybrid ECU.

FIG. 10 is a flowchart showing a process procedure when hybrid ECU 40 according to the third modification recovers the running mode from the MD running to the normal running. Of the steps shown in FIG. 10, the steps denoted by the same numbers as those of the steps shown in FIG. 5 described above have already been described, and thus, detailed description will not be repeated here.

If the engine communication abnormality is not found (NO in S20) and the history of the engine main body abnormality is not found (NO in S21) and cranking power Pcrank is higher than receivable electric power WIN (NO in S26) during the MD running, hybrid ECU 40 determines in S50 whether or not the SOC is lower than lower limit value Sm1. Lower limit value Sm1 used in S50 is set at a value lower than lower limit value Sm used in S22.

If the SOC is higher than lower limit value Sm1 (NO in S50), hybrid ECU 40 continues the MD running in S23. If the SOC is lower than lower limit value Sm1 (YES in S50), hybrid ECU 40 opens SMR 710 and brings about the READY-OFF state in S24.

As described above, in such a situation that recovery to the normal running is awaited because the engine communication abnormality has been resolved but cranking power Pcrank is higher than receivable electric power WIN during the MD running, hybrid ECU 40 according to the third modification changes lower limit value Sm to lower limit value Sm1 lower than lower limit value Sm. As a result, when the engine communication abnormality has been resolved, it is possible to expand the SOC region where the MD running can be continued, as compared with the case in which the engine communication abnormality is not resolved.

In FIG. 10 and FIG. 11 described below, "fuel exhaustion of engine 100" may be included in "engine main body abnormality" in S21. As a result, after checking that a factor of the MD running (factor of engine 100 being in a stopped state) is not fuel exhaustion of engine 100, lower limit value Sm can be changed to lower limit value Sm1 lower than lower limit value Sm.

Fourth Modification

The first to third modifications described above can also be combined as appropriate.

FIG. 11 is a flowchart showing a process procedure when hybrid ECU 40 according to a fourth modification recovers the running mode from the MD running to the normal running. Of the steps shown in FIG. 11, the steps denoted by the same numbers as those of the steps shown in FIGS. 5, 8, 9, and 10 described above have already been described, and thus, detailed description will not be repeated here.

If the engine communication abnormality is not found (NO in S20) and the history of the engine main body abnormality is not found (NO in S21) and cranking power Pcrank is lower than receivable electric power WIN (YES in S26) but vehicle speed V is higher than threshold vehicle speed V1 (NO in S30) during the MD running, hybrid ECU 40 sets second MG torque Tm2 at zero and thereby promotes a decrease in vehicle speed V in S31, because the physical impact of the startup of engine 100 on the powertrain of vehicle 1 is considered to be great. Thereafter, hybrid ECU 40 moves the process to S50.

On the other hand, if the engine communication abnormality is not found (NO in S20) and the history of the engine main body abnormality is not found (NO in S21) and cranking power Pcrank is higher than receivable electric power WIN (NO in S26) during the MD running, hybrid ECU 40 determines in S60 whether or not the SOC is higher than lower limit value Sm1 and lower than a threshold value (=Sm1+α) higher than lower limit value Sm1 by prescribed value α. If the SOC is higher than the threshold value (=Sm1+α) (NO in S60), hybrid ECU 40 moves the process to S50.

On the other hand, if the SOC is lower than the threshold value (=Sm1+α) (YES in S60), hybrid ECU 40 sets second MG torque Tm2 at zero and promotes a decrease in cranking power Pcrank in S31, because there is a possibility that the SOC falls below lower limit value Sm1 and the fail-safe running cannot be continued. Thereafter, hybrid ECU 40 moves the process to S50.

In S50, hybrid ECU 40 determines whether or not the SOC is lower than lower limit value Sm1 (Sm1<Sm). Then, in accordance with the result of determination in S50, hybrid ECU 40 determines whether to continue the MD running (S23) or to bring about the READY-OFF state (S24).

FIG. 12 is a diagram showing one example of a change in vehicle speed V, the SOC and engine rotation speed Ne at the time of recovery from the MD running to the normal running by the process executed by hybrid ECU 40 according to the fourth modification.

Before time t1, the engine communication abnormality is continued, and thus, the MD running is continued. During continuation of the engine communication abnormality, a lower limit value of the SOC region where the MD running can be maintained is set at "lower limit value Sm". In the example shown in FIG. 12, before time t1, the SOC is higher than lower limit value Sm and thus the MD running is continued.

At time t1, the engine communication abnormality has been resolved but vehicle speed V is higher than threshold vehicle speed V1 and the physical impact of the startup of engine 100 on the powertrain of vehicle 1 is considered to be great. Therefore, the MD running is continued without recovery to the normal running. In this situation, the necessity to assume fuel exhaustion of engine 100 is low, and thus, the lower limit value of the SOC region where the MD running can be maintained is changed from lower limit value Sm to lower limit value Sm1 lower than lower limit value Sm. As a result, the MD running can be continued even if the SOC falls below lower limit value Sm at time t2 or later.

In addition, at time t1 when the engine communication abnormality is resolved, the SOC is lower than the threshold value (=Sm1+α) and there is a possibility that the SOC falls below lower limit value Sml and the fail-safe running cannot be continued. Therefore, second MG torque Tm2 is set at zero. As a result, a decrease in SOC is suppressed, and vehicle speed V decreases gradually because the driving power is stopped.

Then, when vehicle speed V falls below threshold vehicle speed V1 at time t3, engine 100 is started and recovery to the normal running is achieved.

As described above, the first to third modifications described above can also be combined as appropriate.

While the embodiment of the present disclosure has been described, it should be understood that the embodiment disclosed herein is illustrative and not limitative in any respect. The scope of the present subject matter is defined by the terms of the claims, and is intended to include any modifications within the scope and meaning equivalent to the terms of the claims.

What is claimed is:

1. A hybrid vehicle, comprising:
an engine;
a first rotating electric machine;
a second rotating electric machine connected to a driving wheel;
a planetary gear mechanism configured to mechanically connect the engine, the first rotating electric machine and the second rotating electric machine such that an absolute value of a rotation speed of the first rotating electric machine decreases with a decrease in an absolute value of a rotation speed of the second rotating electric machine during a stop of the engine;
a battery electrically connected to the first rotating electric machine and the second rotating electric machine;
an engine control unit configured to control the engine; and
a hybrid control unit configured to control the first rotating electric machine and the second rotating electric machine, and output an engine command to the engine control unit by communication with the engine control unit,
when at least one of an abnormality of communication with the engine control unit and an abnormality of the engine occurs during a first mode in which actuation of the engine is permitted, the hybrid control unit being configured to switch a control mode from the first mode to a second mode in which the engine is stopped,
when a predetermined condition is not satisfied during the second mode, the hybrid control unit being configured to maintain the control mode in the second mode, and when the predetermined condition is satisfied during the second mode, the hybrid control unit being configured to start the engine with cranking of the engine by the first rotating electric machine, and recover the control mode to the first mode, and
the predetermined condition being a condition that the abnormality of communication is not found and a history of the abnormality of the engine is not found and electric power generated by the first rotating electric machine during cranking of the engine is lower than electric power receivable by the battery.

2. The hybrid vehicle according to claim 1, wherein when the predetermined condition is satisfied during the second mode and when a vehicle speed is lower than a threshold vehicle speed, the hybrid control unit is configured to recover the control mode to the first mode, and when the predetermined condition is satisfied during the second mode and when the vehicle speed is higher than the threshold vehicle speed, the hybrid control unit is configured to maintain the control mode in the second mode and set output torque of the second rotating electric machine at zero.

3. The hybrid vehicle according to claim 1, wherein when the abnormality of communication is not found and when the history of the abnormality of the engine is not found and when the electric power generated by the first rotating electric machine during cranking of the engine is higher than the electric power receivable by the battery during the second mode, the hybrid control unit is configured to maintain the control mode in the second mode, and set output torque of the second rotating electric machine at zero when a remaining amount of the battery is smaller than a threshold remaining amount.

* * * * *